(12) United States Patent
Sugiura et al.

(10) Patent No.: US 6,475,091 B1
(45) Date of Patent: Nov. 5, 2002

(54) LINKING STRUCTURE FOR POWER TRANSMISSION DEVICE

(75) Inventors: Yasushi Sugiura, Wako (JP); Takeshi Hori, Wako (JP); Tooru Iiizumi, Wako (JP); Toshiyuki Hosokawa, Wako (JP); Jun Okuda, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 74 days.

(21) Appl. No.: 09/677,772

(22) Filed: Oct. 3, 2000

(51) Int. Cl.$^7$ ............................................. F16D 3/205
(52) U.S. Cl. ....................................... 464/23; 464/180
(58) Field of Search ................... 464/23, 180; 403/27; 73/66, 487; 116/333

(56) References Cited

U.S. PATENT DOCUMENTS

| | | | | |
|---|---|---|---|---|
| 1,733,821 A | * | 10/1929 | Pontis | .................... 73/487 X |
| 4,273,006 A | * | 6/1981 | Woodbury | ................. 464/23 X |
| 4,824,275 A | * | 4/1989 | Schlonski | ..................... 403/27 |
| 5,099,943 A | * | 3/1992 | Resca et al. | .............. 464/23 X |
| 5,457,992 A | * | 10/1995 | Guimbretiere | ............. 73/66 X |
| 6,250,155 B1 | * | 6/2001 | Hormann et al. | ............. 73/462 |

FOREIGN PATENT DOCUMENTS

| | | | | |
|---|---|---|---|---|
| GB | 162211 | * | 4/1921 | .................. 403/27 |
| JP | 7-8632 | | 1/1995 | |
| JP | 7-167219 | | 7/1995 | |
| JP | 10-194004 | | 7/1998 | |

OTHER PUBLICATIONS

"Methods and Facilities for Practical Dynamic Balancing," Information Bulletin No. 5, Carl Schenk Maschinenfabrik GMBH, Darmstadt, Germany, 1957, p. 12, 73/66.*

* cited by examiner

*Primary Examiner*—Greg Binda
(74) *Attorney, Agent, or Firm*—Armstrong, Westerman & Hattori, LLP

(57) ABSTRACT

A power transmission device comprises a propeller shaft (PS) and a rear axle device (AR) that is linked and transmits rotational drive force. In the structure linking the propeller shaft and the rear axle device, a first mark indicating the direction of rotational imbalance in the propeller shaft is provided to the propeller shaft, a second mark is provided to a companion flange (30) linked to the propeller shaft in the rotation transmission device, for indicating the direction of rotational imbalance in the companion flange (30), and the propeller shaft and the companion flange are linked on the basis of the first and second marks.

5 Claims, 9 Drawing Sheets

LINKING STRUCTURE FOR POWER TRANSMISSION DEVICE

FIELD OF THE INVENTION

The present invention relates to a structure and method for linking a propeller shaft and an axle device in a power transmission device comprising a propeller shaft that transmits drive force from an engine and an axle device that transmits the rotational drive force of the propeller shaft to the left and right wheels in an automobile or the like.

BACKGROUND OF THE INVENTION

Power transmission devices that transmit engine drive force to the wheels of a front-wheel-drive or four-wheel-drive automobile, for example, are frequently configured such that rotational drive force is transmitted from a transmission to an axle device via a propeller shaft. For instance, in one configuration the engine is installed at the front of the vehicle, and the output rotation from the transmission coupled to the engine is transmitted through a propeller shaft to the rear axle device. A variety of such power transmission devices have been known in the past, and are disclosed in Japanese Laid-Open Patent Applications H10-194004 and H7-8632 and elsewhere.

A problem that is encountered, however, is that if there is any imbalance in the rotating members in the power transmission device, this imbalance tends to cause vibration during rotation transmission. Rotational imbalance is particularly apt to occur when the propeller shaft is a long, cylindrical member extending longitudinally along the chassis. Also, the coupling devices that couple the propeller shaft to the axle device or the like are prone to rotational imbalance because the yoke flanges, companion flanges, and other constituent parts thereof are forged parts, and therefore do not have perfect rotational shapes (annular or cylindrical shapes).

Because of this, propeller shafts are measured by themselves for imbalance, and are balanced by attaching adjustment weights that cancel out the imbalance. With axles, the runout during rotation is measured with the axle in an assembled state, at the end face and outer peripheral surface of the companion flange attached to the input member end of the axle, and [the components are] put together such that the imbalance caused by this runout cancels out the imbalance of the propeller shaft coupled to the companion flange.

With this balancing method, the rotary system of the axle must be rotationally driven and the runout of the companion flange measured with the axle in an assembled state, and furthermore measurement is required for each and every axle, so a tremendous amount of labor and cost are entailed by this measurement.

SUMMARY OF THE INVENTION

It is an object of the present invention to provide a structure and method for linking a propeller shaft and an axle input member so that the occurrence of rotational imbalance can be effectively suppressed.

It is a further object of the present invention to provide a linking structure and method with which the measurement of rotational imbalance, and the adjustment thereof, can be carried out more simply.

The linking structure pertaining to the present invention links the propeller shaft and the rotation transmission device in a power transmission device (such as the transfer mechanism TF or the rear axle device AR in the examples) comprising a propeller shaft that transmits rotational drive force and a rotation transmission device that is linked to the propeller shaft and transmits rotational drive force. In this linking structure, a first mark indicating the rotational imbalance direction in the propeller shaft is provided to the propeller shaft, a second mark indicating the rotational imbalance direction in a companion flange that is linked to the propeller shaft in the rotation transmission device is provided to this companion flange, and the propeller shaft and the companion flange are linked on the basis of the first and second marks.

In this linking structure, it is preferable if the first mark is provided in the direction in which the unbalanced rotational mass of the propeller shaft becomes lighter, the second mark is provided in the direction in which the unbalanced rotational mass of the companion flange becomes heavier, and the propeller shaft and the companion flange are linked such that the first and second marks are as close together as possible. The structure may also be the opposite of this, in which the first mark is provided in the direction in which the unbalanced rotational mass of the propeller shaft becomes heavier, the second mark is provided in the direction in which the unbalanced rotational mass of the companion flange becomes lighter, and the propeller shaft and the companion flange are linked such that the first and second marks are as close together as possible.

With the linking structure pertaining to the present invention, when the propeller shaft and the companion flange are coupled, they are coupled such that the lighter and heavier unbalanced rotational masses are in opposition, so that the imbalance of the two components is canceled out and there is less imbalance overall in the power transmission device.

It is preferable if the companion flange is directly and rotatably supported by a bearing in the rotation transmission device.

The above-mentioned rotation transmission device can comprise an axle device having a final reduction device, and be structured such that the companion flange is attached to the input rotation shaft of the final reduction device.

In this case, the final reduction device can comprise a hypoid drive pinion and a hypoid driven gear that mesh with each other, the pinion shaft having this hypoid drive pinion can constitute the input rotation shaft, and the companion flange can be splined to the pinion shaft.

The linking method pertaining to the present invention is a method for linking a propeller shaft and a rotation transmission device in a power transmission device having a propeller shaft that transmits rotational drive force and a rotation transmission device that is linked to the propeller shaft and transmits rotational drive force. This method comprises the steps of measuring the rotational imbalance in the propeller shaft, providing a first mark indicating the direction of rotational imbalance in the propeller shaft, in the proximity of the linked portion of the propeller shaft, measuring the rotational imbalance of the companion flange linked to the propeller shaft in the rotation transmission device, providing a second mark indicating the direction of rotational imbalance in the companion flange, in the proximity of the linked portion of the companion flange, and linking the propeller shaft and the companion flange on the basis of the first and second marks.

With this linking method, it is preferable if the first mark is provided in the direction in which the unbalanced rotational mass of the propeller shaft becomes lighter, the second mark is provided in the direction in which the unbalanced rotational mass of the companion flange becomes heavier, and the propeller shaft and the companion flange are linked such that the first and second marks are as close together as possible. The structure may also be the opposite of this, in which the first mark is provided in the direction in which the unbalanced rotational mass of the propeller shaft becomes heavier, the second mark is provided in the direction in which the unbalanced rotational mass of the companion flange becomes lighter, and the propeller shaft and the companion flange are linked such that the first and second marks are as close together as possible.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein:

FIG. 5 illustrates the end face shape of the companion flange used in the rear axle device;

DESCRIPTION OF THE PREFERRED EMBODIMENTS

Figure 1:
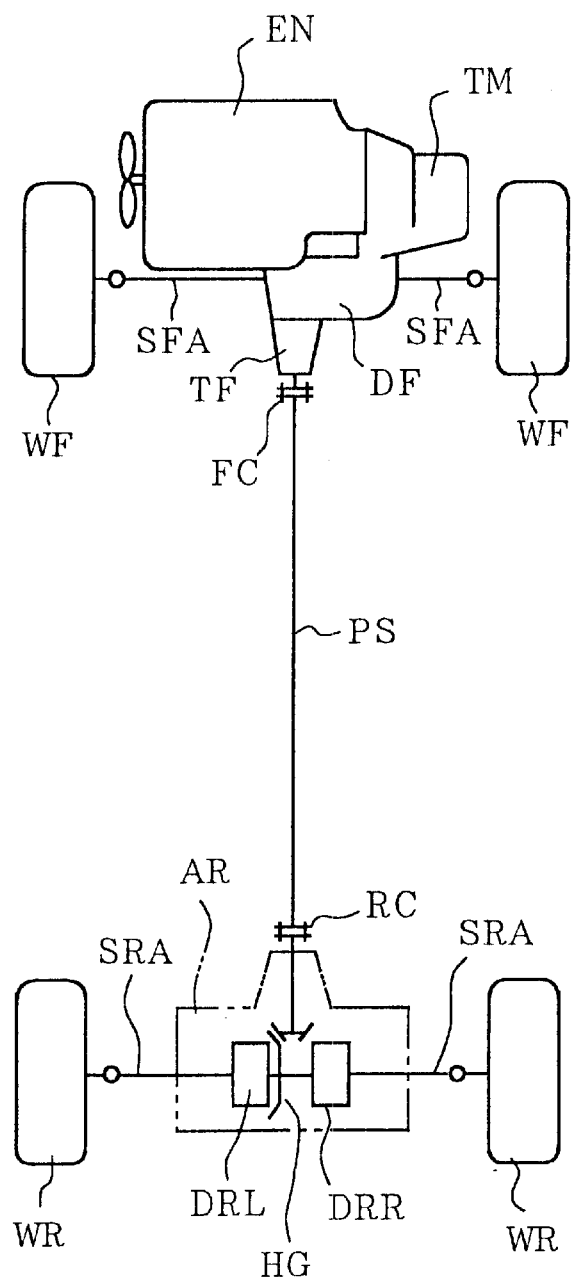
FIG. 1 is a schematic diagram illustrating a power transmission device in a four-wheel-drive vehicle, equipped with the power transmission device pertaining to the present invention.
Figure 2:
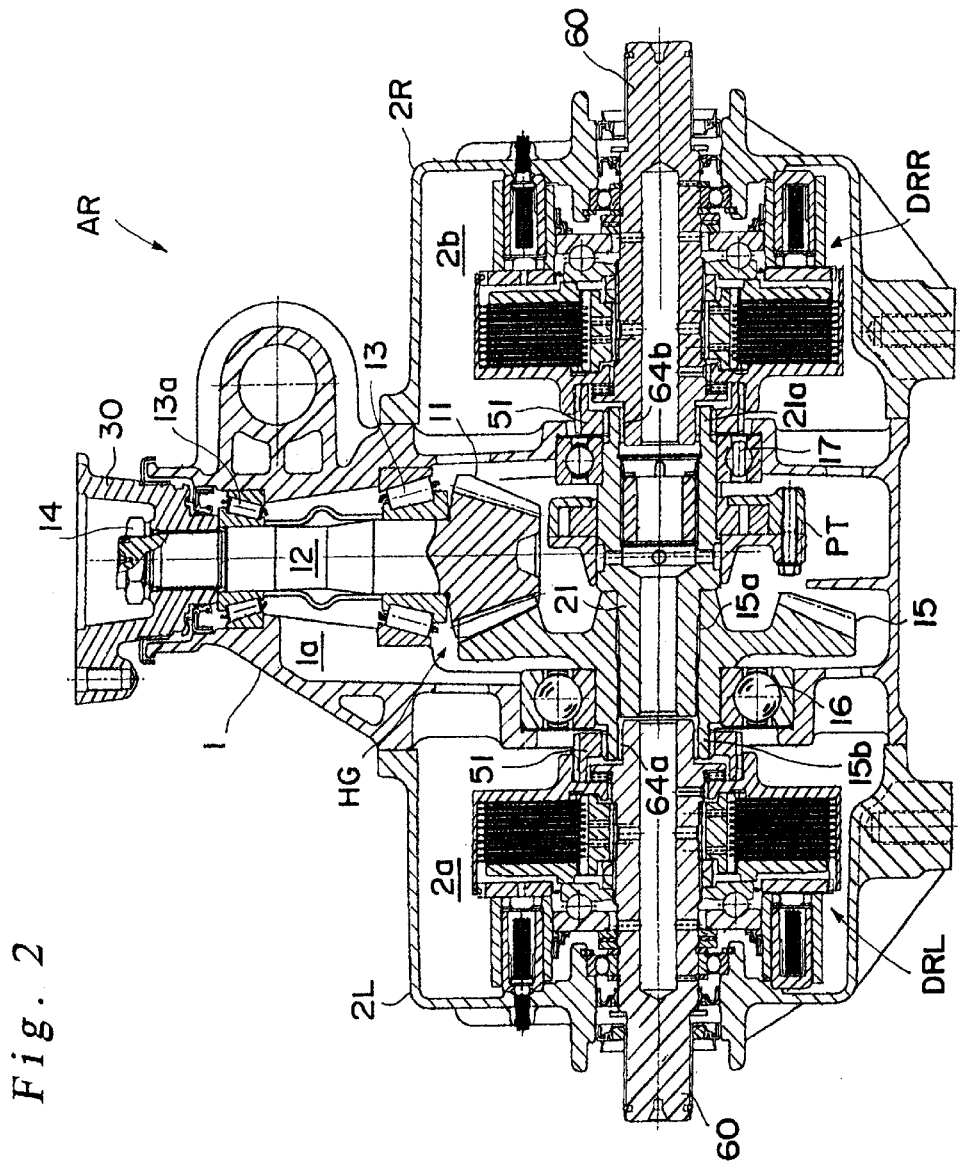
FIG. 2 is a cross section illustrating the structure of the rear axle device in the above-mentioned power transmission device.
Figure 3:
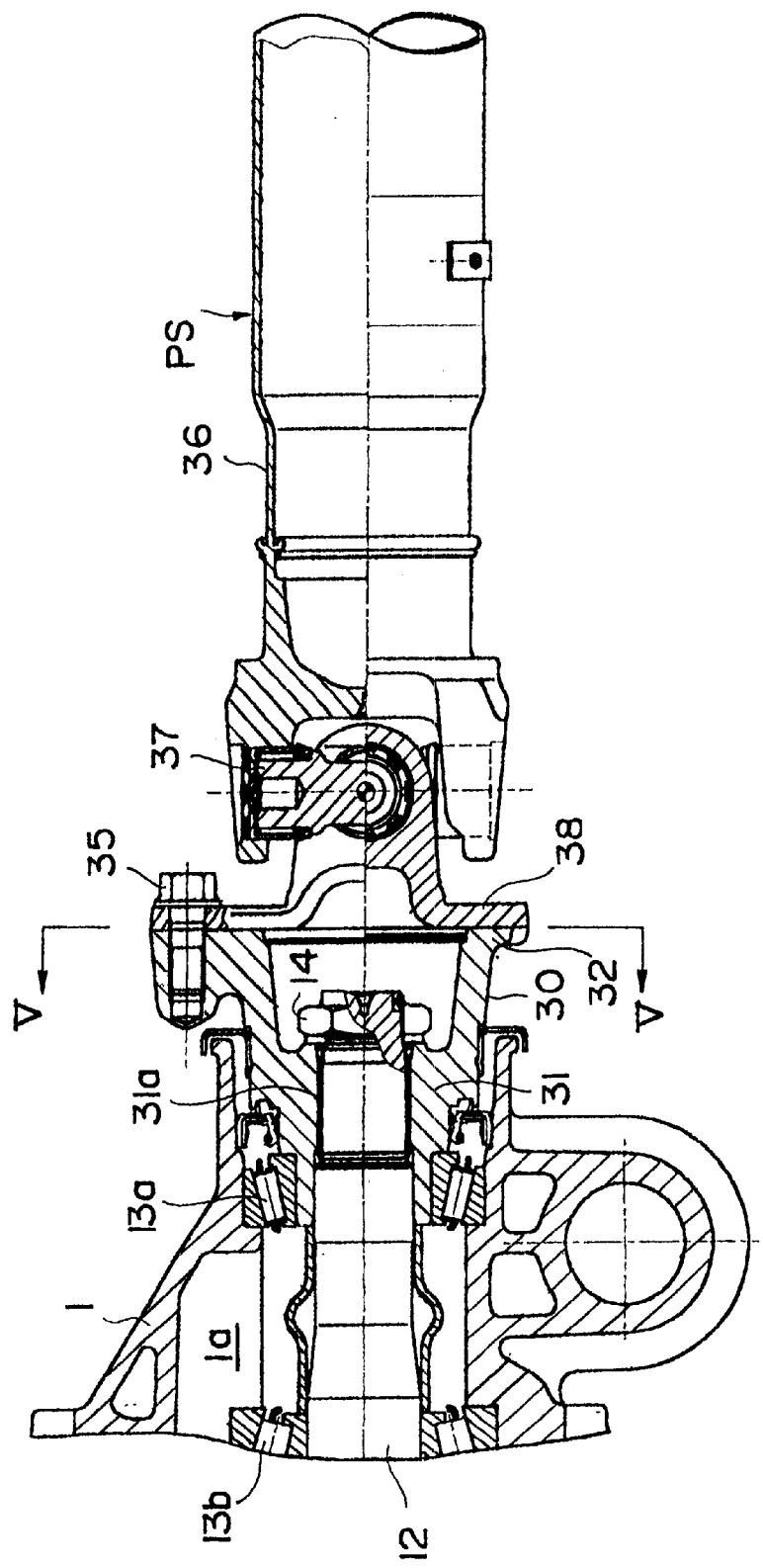
FIG. 3 is a partial cross section illustrating the linked portion of the above-mentioned rear axle device and a propeller shaft linked with the linking structure pertaining to the present invention.

Preferred embodiments of the present invention will now be described through reference to the figures. First, as an example of the power transmission device pertaining to the present invention, FIG. 1 illustrates a power transmission system in a vehicle having an axle device in which an electromagnetic clutch is used as the differential clutch mechanism.

This vehicle is a four-wheel-drive vehicle, in which an engine EN is installed transversely at the front of the chassis and a transmission TM is integrally coupled to the output end of the engine EN. A front differential mechanism DF and a transfer mechanism TF are provided inside this transmission TM. The power of the engine EN, whose speed is varied by the transmission TM, is split by the front differential mechanism DF and transmitted to left and right front axle shafts SFA so as to drive the left and right front wheels WF. The above-mentioned engine power is also split by the transfer mechanism TF and transmitted from a front coupling FC to a propeller shaft PS. This propeller shaft PS is linked to a rear axle device AR via a rear coupling RC.

The rear axle device AR has a hypoid gear mechanism HG (final reduction mechanism) that converts the rotational direction such that the rotation of the propeller shaft PS can be transmitted to rear axle device shafts SRA perpendicular to this rotation, and reduces the speed of this rotation, and a pair of left and right differential clutch mechanisms DRL and DRR that are located to the left and right of the hypoid gear mechanism HG and control the transmission of the rotational power of the hypoid gear mechanism HG to the rear axle shafts SRA. In the rear axle AR, the engine power transmitted through the propeller shaft PS is converted in its rotational direction via the hypoid gear mechanism HG and is reduced in speed, then split and transmitted to the left and right rear axle shafts SRA with the transmission controlled by the left and right differential clutch mechanisms DRL and DRR, allowing the left and right rear wheels WR to be driven.

These rear differential clutch mechanisms DRL and DRR have electromagnetic clutches, whose engagement is controlled according to the rotational speed of the wheels, the gear ratios of the vehicle, and so forth. Accordingly, if the left and right rear differential clutch mechanisms DRL and DRR are both released, the engine power is not transmitted to the rear wheels WR, and only the front wheels WF are driven, resulting in a two-wheel-drive state. On the other hand, if the left and right rear differential clutch mechanisms DRL and DRR are engaged, the engine power is transmitted to the front wheels WF and to the rear wheels WR, resulting in a four-wheel-drive state. In this four-wheel-drive state, the rear differential clutch mechanisms DRL and DRR are engaged whenever there is a difference between the drive-side rotation and the wheel rotation, as will be discussed below. Suitably controlling the engagement of the left and right rear differential clutch mechanisms DRL and DRR affords the suitable control of the ratio in which the power is split to the left and right rear wheels WR, providing what is known as a differential function.

The above-mentioned rear axle device AR will be described through reference to FIGS. 2 to 6. The pair of left and right rear differential clutch mechanisms DRL and DRR are installed inside the rear axle device AR as mentioned above, but since these have a structure that is symmetrical to the left and right, the left and right symmetrical portions will be labeled the same and redundant descriptions will be omitted.

The rear axle device AR has a center housing 1 and left and right side housings 2L and 2R coupled to the left and right ends of the center housing 1. The hypoid gear mechanism HG is disposed inside a center space 1A formed inside the center housing 1, the left rear differential clutch mechanism DRL is disposed inside a left side space 2a formed inside the left side housing 2L, and the right differential clutch mechanism DRR is disposed in a right side space 2b formed inside the right side housing 2R.

The hypoid gear mechanism HG disposed inside the center housing 1 comprises a drive pinion 11 and a driven gear 15 whose rotational axes are perpendicular and which mesh with each other. The drive pinion 11 is able to rotate around a rotational axis extending in the longitudinal direction of the chassis, and has a pinion shaft 12 that extends in the longitudinal direction of the chassis and is supported rotatably with respect to the center housing 1 by tapered roller bearings 13a and 13b. The distal end of the pinion shaft 12 protrudes out from the center housing 1.

A companion flange 30 is fastened by a retainer nut 14 and splined to this portion of the pinion shaft 12 that protrudes outward. The companion flange 30 is linked to the pinion shaft 12 by a spline 31a formed on a boss 31, and has at its outer end an end face flange 32 shaped as shown in FIG. 5. Threaded holes 32a for attaching fastener bolts are formed in the end face flange 32. Meanwhile, the propeller shaft PS has a yoke flange 38 attached via a universal joint 37 to the rear end of a drive tube 36 extending in the longitudinal direction of the chassis and rotatably supported, and this yoke flange 38 and the companion flange 30 are coupled by fastener bolts 35. The yoke flange 38 and the companion flange 30 constitute the rear coupling RC. The rotation of the propeller shaft PS is transmitted to the drive pinion 11 and rotationally drives the hypoid gear mechanism HG.

The driven gear 15 of the hypoid gear mechanism HG is rotatable around the rotational axis extending in the lateral direction of the chassis (the rotational axis perpendicular to the rotational axis of the drive pinion 11) and is supported by the center housing 1 via a ball bearing 16. An internal spline 15a is formed around the rotational axis in the driven gear 15, and a center shaft 21 that meshes with this internal spline 15a at the left end is disposed inside the center housing 1 along the same axis as the driven gear 15. The right end of the center shaft 21 is rotatably supported by the center housing 1 via a ball bearing 17, and the center shaft 21 rotates integrally with the driven gear 15.

The left end 15b of the driven gear 15 is splined to a left linking ring 51 around the outer periphery, and the driven gear 15 is linked to the left rear differential clutch mechanism DRL via this left linking ring 51. The right end 21a of the center shaft 21 is splined to the left linking ring 51 around the outer periphery, and the center shaft 21 is linked to the left rear differential clutch mechanism DRL via this left linking ring 51. Here, the center shaft 21 is splined to the driven gear 15, and the driven gear 15 (that is, the hypoid gear mechanism HG) is linked to the left and right differential clutch mechanisms DRL and DRR.

Figure 4:
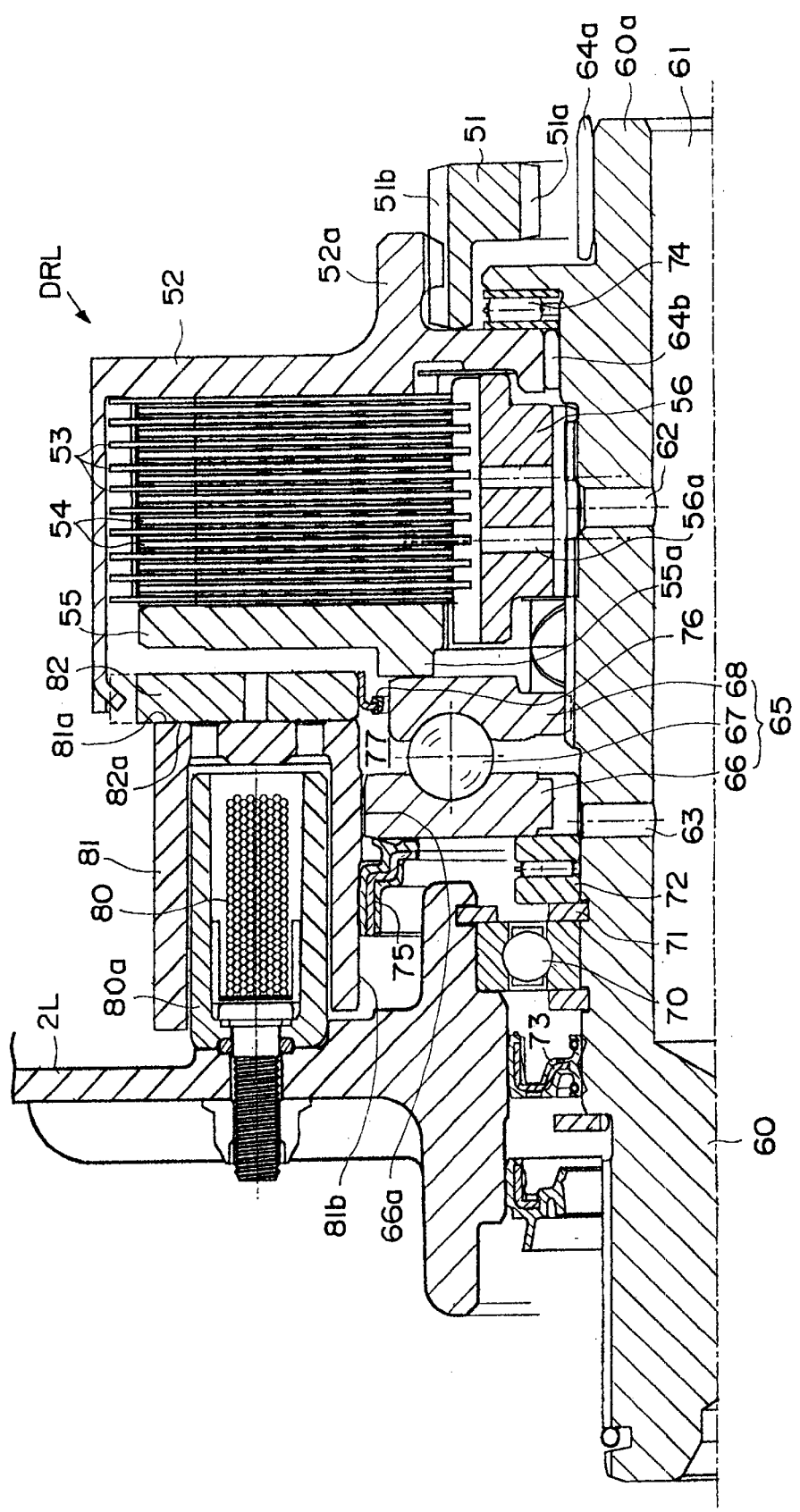
FIG. 4 is a cross section illustrating the left differential clutch mechanism in the above-mentioned rear axle device.

These left and right differential clutch mechanisms DRL and DRR will be described through reference to FIG. 4, which illustrates the left differential clutch mechanism DRL. As mentioned above, the left differential clutch mechanism DRL is in left and right symmetry with the right differential clutch mechanism DRR, and since the structure and operation thereof are identical, only the left differential clutch mechanism DRL will be described, and description of the right differential clutch mechanism DRR will be omitted.

The left differential clutch mechanism DRL has the cylindrical clutch housing 52 and a plurality of separator plates 53 and a plurality of clutch plates 54 disposed inside this clutch housing 52. The clutch housing 52 is splined to the outer periphery 51b of a linking ring 51 at a right end hub 52a. The separator plates 53 consist of metal disk-shaped members that are engaged with the inner surface of the clutch housing 52 around the outer periphery, and rotate integrally with the clutch housing 52. The clutch plates 54 comprise a clutch facing material bonded to both sides of metal disk-shaped members, and are disposed between the various separator plates 53. Specifically, the separator plates 53 and the clutch plates 54 are arranged alternating in the axial direction. A disk-shaped pressure plate 55 is provided so as to cover from the outside these plates 53 and 54 that are disposed inside the clutch housing 52 in these alternating positions.

A clutch hub 56 is provided on the inner peripheral side of the separator plates 53, clutch plates 54, and pressure plate 55 disposed inside the clutch housing 52. The inner periphery of the clutch plates 54 engages with the outer periphery of the clutch hub 56, so that the clutch plates 54 and the clutch hub 56 rotate integrally. This clutch hub 56 is disposed over a left side shaft 60, splined at the inner periphery. The clutch housing 52 is rotatably attached over the left side shaft 60 by a radial bearing 64b and a thrust bearing 74.

The left side shaft 60 has its right end 60a inserted into a support hole formed in the right end of the driven gear 15, so that the left side shaft 60 is rotatably supported by a radial bearing 64a, and on its left side is rotatably supported by the left side housing 2L via a ball bearing 70. In the case of the left side shaft 60, the right end is inserted into a support groove formed in the left end of the center shaft 21 and is rotatably supported by a radial bearing 64a. This left shaft 60 is connected to the left rear wheel WR and constitutes the left rear axle shaft SRA.

The inner side surface of the pressure plate 55 protrudes to the left and forms a pressing component 55a, and a ball cam mechanism 65 is disposed so as to abut against this pressing component 55a. The ball cam mechanism 65 comprises a first cam plate 66 disposed rotatably over the left side shaft 60, a second cam plate 68 disposed splined to the left side shaft 60, and a plurality of cam balls 67 disposed in a plurality of cam grooves 66a and 68a formed in the cam plates 66 and 68 (see FIGS. 6A and 6B).

The first cam plate 66 is axially positioned with respect to the left side shaft 60 by a retaining ring 72 and a thrust bearing 72. Accordingly, as discussed below, the thrust force generated by the ball cam mechanism 65 is received by the first cam plate 66, acts on the second cam plate 68 via the cam balls 67, moves the second cam plate 68 to the right, and presses the pressing component 55a of the pressure plate 55 to the right.

A doughnut-shaped coil housing 81 having a rectangular cross section open at the left end is disposed on the outer peripheral side of the first cam plate 66. This coil housing 81 is in the form of a doughnut centered around the rotational center of the left side shaft 60, is splined at its inner periphery to the outer periphery of the first cam plate 66, and is able to rotate over the left side shaft 60 integrally with the first cam plate 66.

A solenoid coil 80 is provided protruding into a space with a rectangular cross section and open at the left end in the coil housing 81. This solenoid coil 80 is formed in a doughnut shape covered by a solenoid cover 80a, and is fixed to the left side housing 2L. There is gap between the outer surface of the solenoid cover 80a and the inner surface of the rectangular-cross-section space of the coil housing 81, and the coil housing 81 is freely rotatable with respect to the fixed solenoid coil 80.

A disk-shaped armature plate 82 is provided facing a sliding surface 81a that forms the right end surface of the coil housing 81. The armature plate 82 engages with the clutch housing 52 around its outer periphery, and rotates integrally with the clutch housing 52.

An oil seal 75 is attached to the inner peripheral surface 81b of the coil housing 81, and the lip thereof slides over the left side of the first cam plate 66. An oil fence ring 76 is attached to the inner peripheral surface of the armature plate 82. As a result, an oil reservoir 77 is formed by being sandwiched between the oil seal 75 and the oil fence 76 on the inner peripheral side of the inner peripheral surface of the armature plate 82 and the inner peripheral surface of the coil housing 81. This oil reservoir 77 communicates with the gap between the sliding surface 81a of the coil housing and the sliding surface 82a forming the left end surface of the armature plate 82.

The oil fence ring 76 comprises a rubber lip attached to the inner peripheral end of an annular metal core. Therefore, the inner peripheral end of the oil fence ring 76 is close to the outer peripheral surface of the second cam plate 68, but even if the two should come into contact during rotation, the contact is between rubber and metal, thereby avoiding the problems of scratching and noise generated by contact.

A first lubricating hole 61 extending in the axial direction from the right end surface is formed inside the left side shaft 60, and second and third lubricating holes 62 and 63 are formed extending radially from this first lubricating hole 61. Lubricating oil is supplied to the first lubricating hole 61 from a trochoid pump PT attached over the center shaft 21. This lubricating oil is supplied from the second lubricating hole 62, through a lubricating hole 56a formed in the clutch hub 56, to the space between the separator plates 53 and the clutch plates 54, and is supplied from the third lubricating hole 63, through the ball cam mechanism 65 (through the space between the first cam plate 66 and the second cam plate 68), to the oil reservoir 77. Therefore, the ball cam mechanism 65 is also thoroughly lubricated.

The lubricating oil in the oil reservoir 77 is effectively supplied to the gap between the sliding surface 81a of the coil housing 81 and the sliding surface 82a of the armature plate 82. Accordingly, smooth sliding contact is achieved, without any noise being generated, when the sliding surface 81a of the coil housing 81 is in sliding contact with the sliding surface 82a of the armature plate 82.

The operation of the left differential clutch mechanism DRL structured as above will now be described.

As mentioned above, when [the engine power] is transmitted from the propeller shaft PS to the hypoid gear mechanism HG so as to rotationally drive the driven gear 15, the rotational power is transmitted through the linking ring 51 to the clutch housing 52 so as to rotationally drive the clutch housing 52. Here, when the thrust force is not acting upon the pressure plate 55 via the ball cam mechanism 65, that is, when the pressure plate 55 is in a free state, the separator plates 53 merely rotate integrally with the clutch housing 52, and the clutch plates 54 rotate integrally with the clutch hub 56, with no power transmitted between the plates 53 and 54. Accordingly, no drive force is transmitted to the rear wheels WR, and the vehicle will be in a two-wheel-drive state.

Meanwhile, when the thrust force presses the pressure plate 55 to the right from the ball cam mechanism 65, the pressure plate 55 presses the separator plates 53 and clutch plates 54 against the clutch housing 52, and the plates 53 and 54 are engaged by their frictional force. This causes the clutch housing 52 and the clutch hub 56 to rotate integrally, resulting in a four-wheel-drive state in which the drive force is transmitted to the rear wheels WR.

Controlling the thrust force in this way so that it is applied to the pressure plate 55 through the ball cam mechanism 65 is accomplished by controlling the current sent to the solenoid coil 80. When the power to the solenoid coil 80 is switched on, a magnetic force is generated in the coil housing 81 surrounding this coil, and the armature plate 82 is clamped to the coil housing 81. As a result, the sliding surface 81a of the coil housing 81 slides with the sliding surface 82a of the armature plate 82, and a rotational force F acts upon the coil housing 81 such that the coil housing 81 is made to rotate the same as the armature plate 82, which rotates integrally with the clutch housing 52.

Here, the coil housing 81 is coupled to the first cam plate 66, and the first cam plate 66 is coupled to the left side shaft 60 and rotates integrally with the rear wheels WR. The armature plate 82, on the other hand, is engaged with the clutch housing 52, and the clutch housing 52 is linked to the driven gear 15 and corresponds to the rotation of the engine EN. We can see from this that the above-mentioned rotational force F is not generated when the rotation of the driven gear 15 driven by the engine EN is the same as the rotation of the rear wheels WR, but this rotational force F is generated when there is a rotational difference.

Figure 6A:
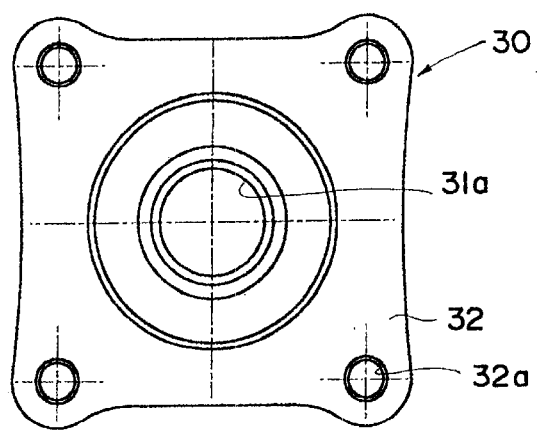
FIGS. 6A and 6B are cross sections illustrating the ball cam mechanism that constitutes the above-mentioned left differential clutch mechanism.
Figure 6B:
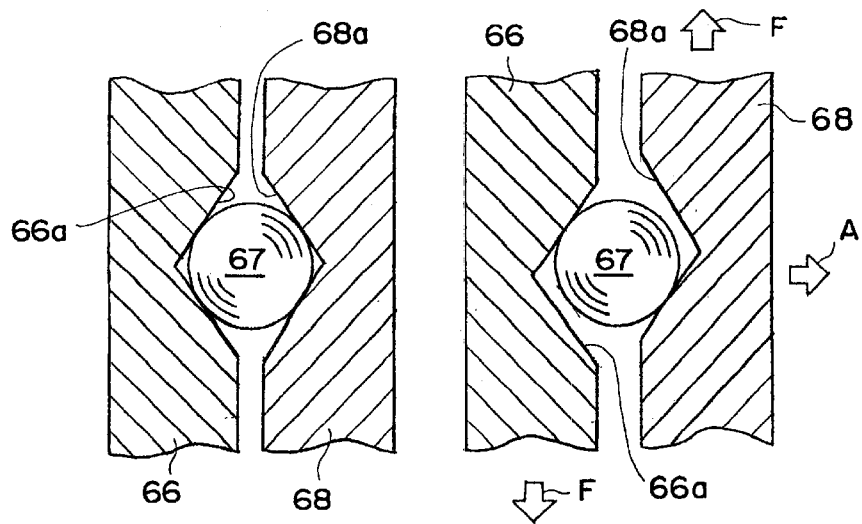

When a rotational difference thus occurs between the rotation of the driven gear 15 driven by the engine EN and the rotation of the rear wheels WR, and the above-mentioned rotational force F is generated, this rotational force F acts as a force that rotates the second cam plate 68 with respect to the first cam plate 66 in the ball cam mechanism 65, as shown in FIG. 6B. Here, cam balls 67 are disposed within cam grooves 66a and 68a, which have tapered surfaces, in between the two cam plates 66 and 68. Accordingly, the above-mentioned rotational force F causes the second cam plate 68 to rotate relative to the first cam plate 66, and the second cam plate 68 moves to the right in the axial direction as indicated by the arrow A in FIG. 6B.

This movement of the second cam plate 68 to the right presses the pressing component 55a of the pressure plate 55 to the right, and the pressure plate 55 presses the separator plates 53 and clutch plates 54 against the clutch housing 52. As a result, the plates 53 and 54 are engaged by their frictional force, and the above-mentioned rotational difference is suppressed. The pressing force exerted on the pressure plate 55 in this case corresponds to the above-mentioned rotational force F, and this rotational force F corresponds to the attractive force of the armature plate 82 resulting from the magnetic force of the armature plate 82.

As can be seen from the above, the clutch engagement force can be freely controlled in the left differential clutch mechanism DRL by controlling the current sent to the solenoid coil 80, allowing control over the clamping of the armature plate 82 while the sliding surface 82a of the armature plate 82 slides with respect to the sliding surface 81a of the coil housing 81. Smooth control is possible here because the lubricating oil is effectively supplied in between the sliding surfaces 81a and 82a from the oil reservoir 77.

When the sliding surface 82a of the armature plate 82 is clamped by magnetic force to the sliding surface 81a of the coil housing 81 as above, if there is a gap between the sliding surfaces 81a and 82a, then the flow of the magnetic flux will be obstructed in this portion and the clamping force will decrease. Accordingly, it is preferable to make the gap between the sliding surfaces 81a and 82a as small as possible, that is, for the sliding surfaces 81a and 82a to be as close together as possible. Because the armature plate 82 is disk-shaped as shown in the figures, it may be deformed into a conical shape by heat treatment or the like. The amount of this deformation is small, but this deformation decreases the clamping force because it produces a gap between the above-mentioned sliding surfaces 81a and 82a. Accordingly, it is preferable to work the sliding surface 81a of the coil housing 81 to match the deformed shape of the coil housing 81, thereby reducing the gap between the sliding surfaces 81a and 82a and providing a snugger fit.

We will now describe the adjustment of the rotational imbalance in the propeller shaft PS and the rear coupling RC in the power transmission device described above. First, with a propeller shaft, rotational imbalance is measured for the shaft alone, before its installation, and the shaft is balanced by attaching balancing weights at specific locations so as to cancel out the imbalance. There is prior art for the apparatus and method for adjusting this rotational imbalance and attaching balancing weights, disclosed, for example, in Japanese Laid-Open Patent Application H7-167219. It is difficult to completely eliminate rotational imbalance by attaching balancing weights alone, and a certain amount of imbalance always seems to remain. This remaining imbalance is measured, and a first mark indicating the imbalance direction is made at the end face or around the outer periphery of a yoke flange 38 provided at the rear end of the propeller shaft PS. This first mark is made, for instance, in the direction in which the unbalanced rotational mass becomes lighter.

Next, the rotational imbalance is adjusted for the companion flange 30 alone, prior to the assembly of the above-mentioned rear axle device AR. Balancing holes are made at specific locations in the companion flange 30 so as to cancel out this imbalance. Here again, though, it is difficult to completely eliminate the rotational imbalance with these balancing holes, so the imbalance remaining after the balancing holes have been made is measured, and a second mark indicating the direction of this imbalance is made at the end face on around the outer periphery of the yoke flange 38. This second mark is made, for instance, in the direction in which the unbalanced rotational mass becomes heavier. After this, the rear axle device AR is assembled using the yoke flange 38.

Next, the companion flange 30 in the assembled rear axle device AR is linked by fastening bolts 35 to the propeller shaft PS which has been balanced as above. The companion flange 30 is rotationally aligned with the yoke flange 38 here so that the first mark will be as close as possible to the second mark. Here, the first mark is made in the direction in which the unbalanced rotational mass becomes lighter, while the second mark is made in the direction in which the unbalanced rotational mass becomes heavier, so the imbalance of the two components is canceled out and the overall imbalance can be minimized.

The above description was for the rear coupling RC, but the same applies to the front coupling FC.

Figure 9A:
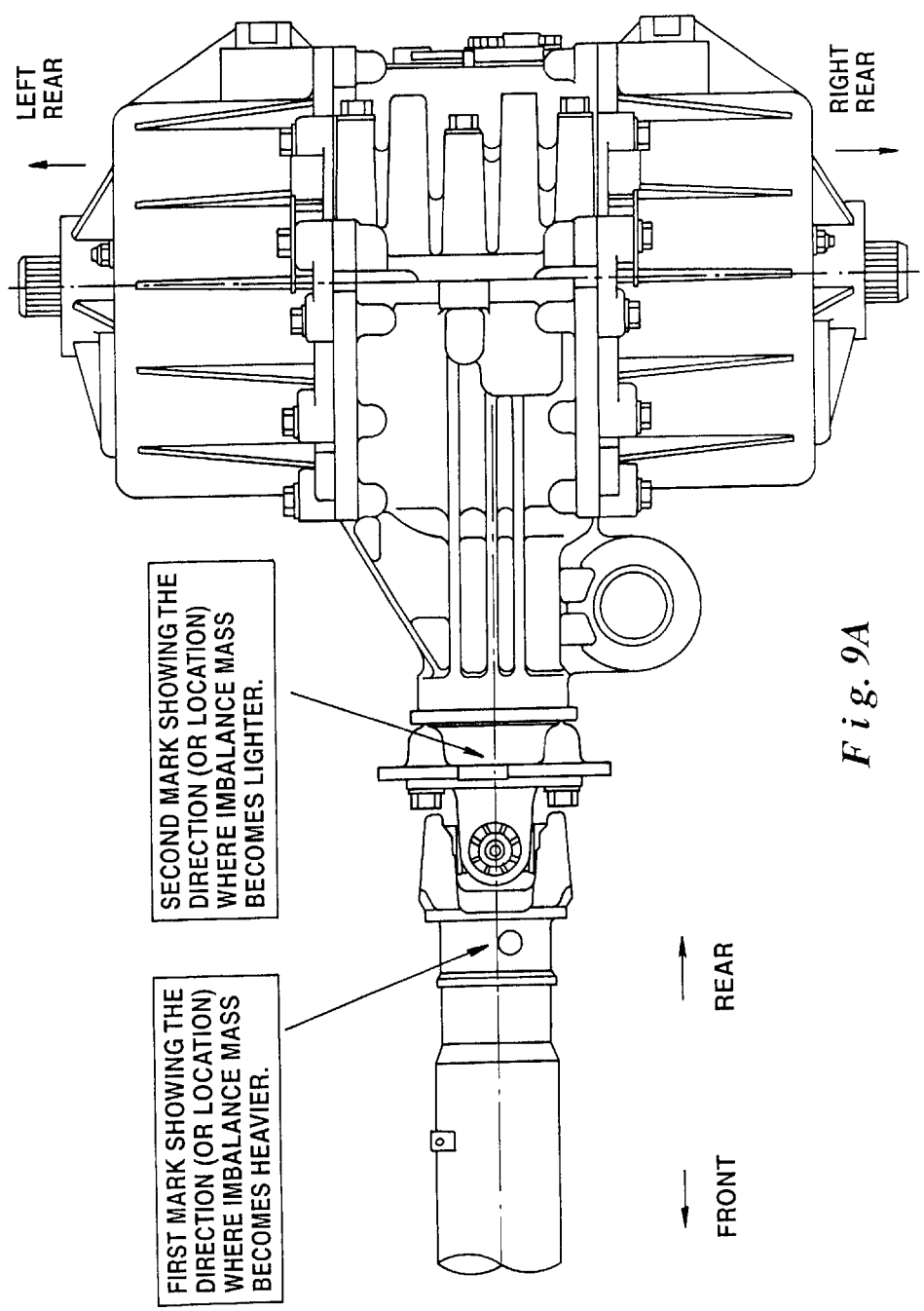
FIG. 9A is a bottom view of FIG. 3 showing an imbalance mass as represented by a first mark becomes heavier and an imbalance mass as represented by a second mark becomes lighter.
Figure 9B:
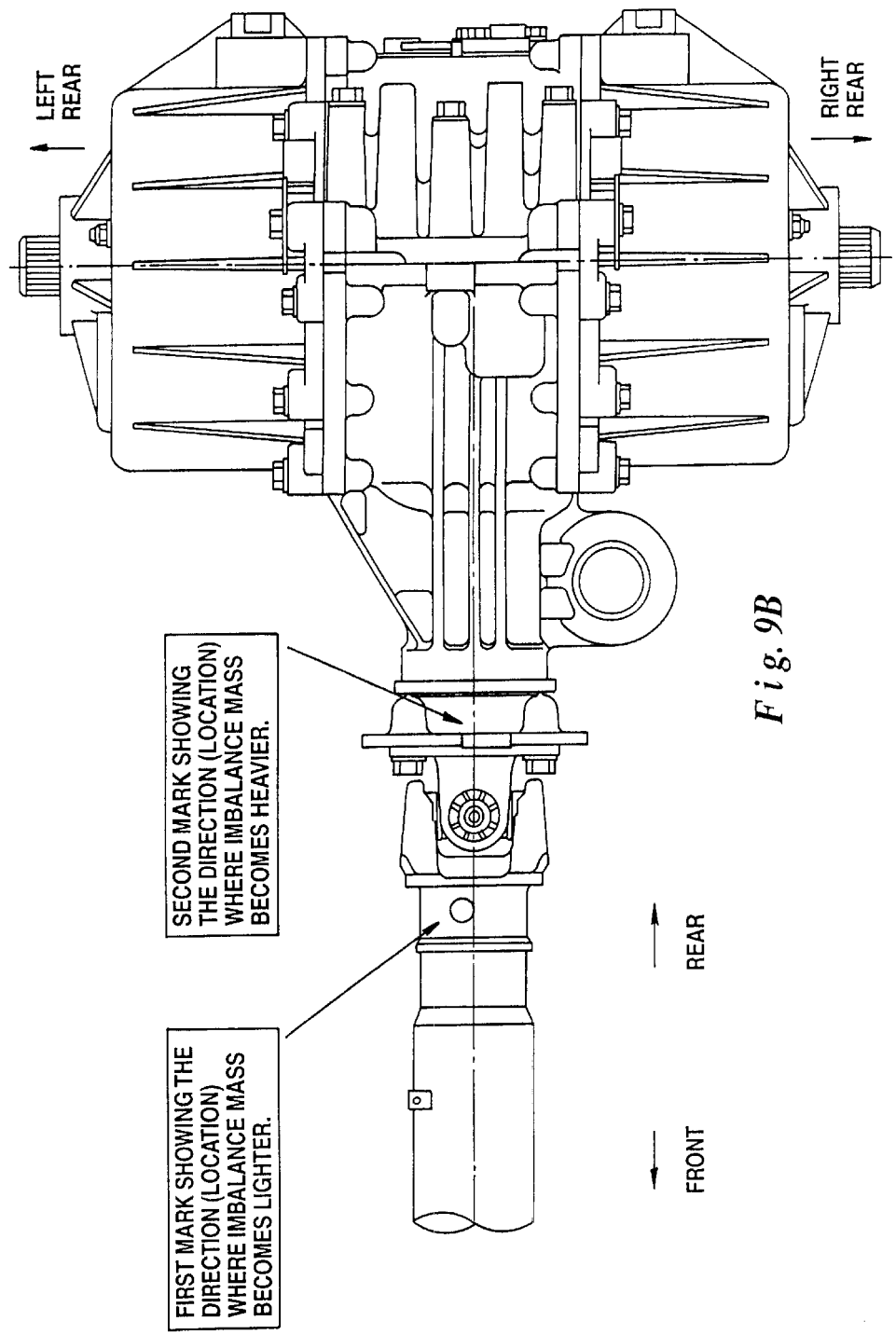
FIG. 9B is a bottom view of FIG. 3 showing an imbalance mass as represented by a first mark becomes lighter and an imbalance mass as represented by a second mark becomes heavier.

The interplay between an imbalance mass as represented by the first mark and an imbalance mass as represented by the second mark, where the first mark becomes heavier and the second mark becomes lighter, vice versa, are respectively shown by way of depictions in FIGS. 9A and 9B.

Figure 7:
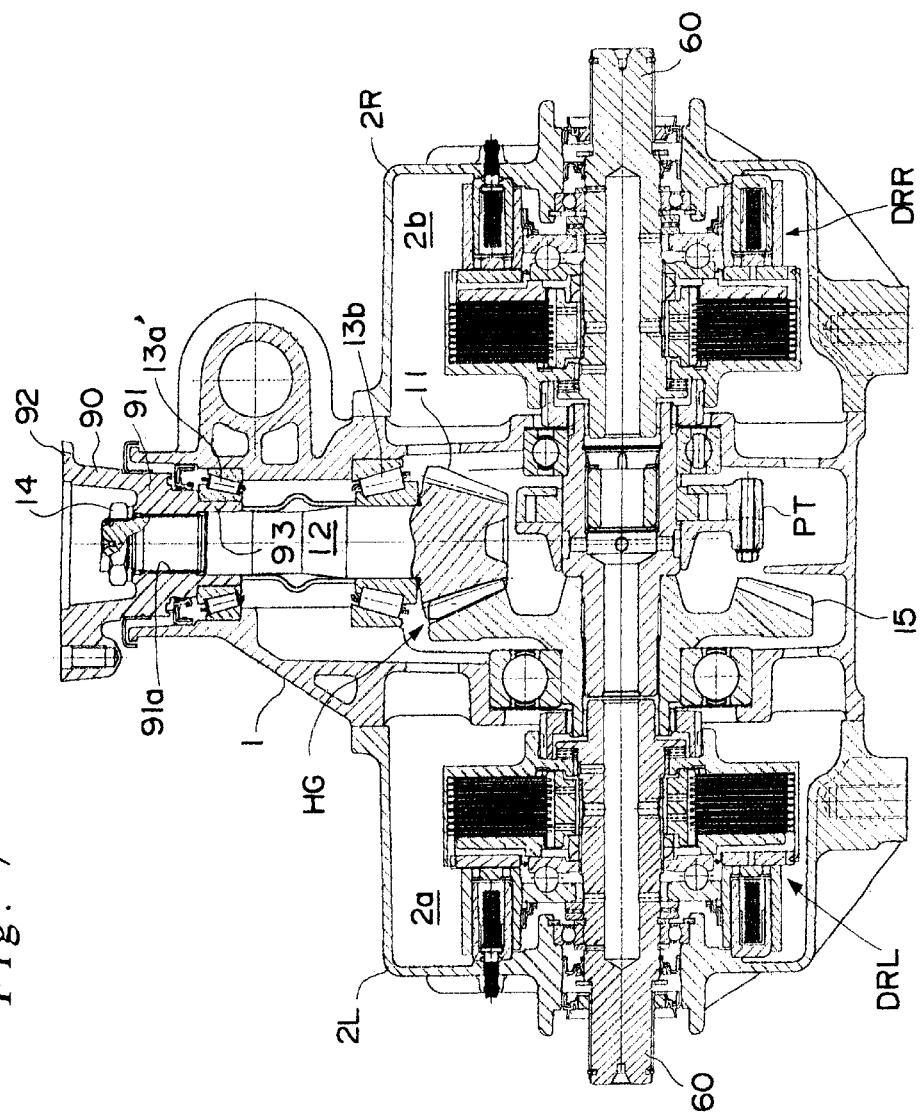
FIG. 7 is a cross section illustrating a different example of the rear axle device in the above-mentioned power transmission device.

FIG. 7 shows a rear axle device pertaining to a different embodiment of the present invention. The only difference between this rear axle device and the rear axle device shown in FIGS. 2 to 5 is the structure of a companion flange 90 and the attached portion thereof. Since the rest of the structure is identical, the same components are labeled with the same numbers and will not be described again.

The companion flange 30 shown in FIGS. 2 to 5 is linked to a pinion shaft 12 via a spline 31a. The pinion shaft 12 is rotatably supported by tapered roller bearings 13a and 13b, and virtually no rotational imbalance occurs, but there is rotational looseness corresponding to the backlash in the spline 31a, and it can therefore be considered that vibration tends to be caused by rotational imbalance. To deal with this, the companion flange 90 shown in FIG. 7 is such that the rear end 91a of a boss 91 protrudes inward, and the companion flange 90 is rotatably supported by a tapered roller bearing 13a'. Because the companion flange 90 is thus directly supported by the tapered roller bearing 13a', less vibration is caused by rotational imbalance in the companion flange 90.

Figure 8:
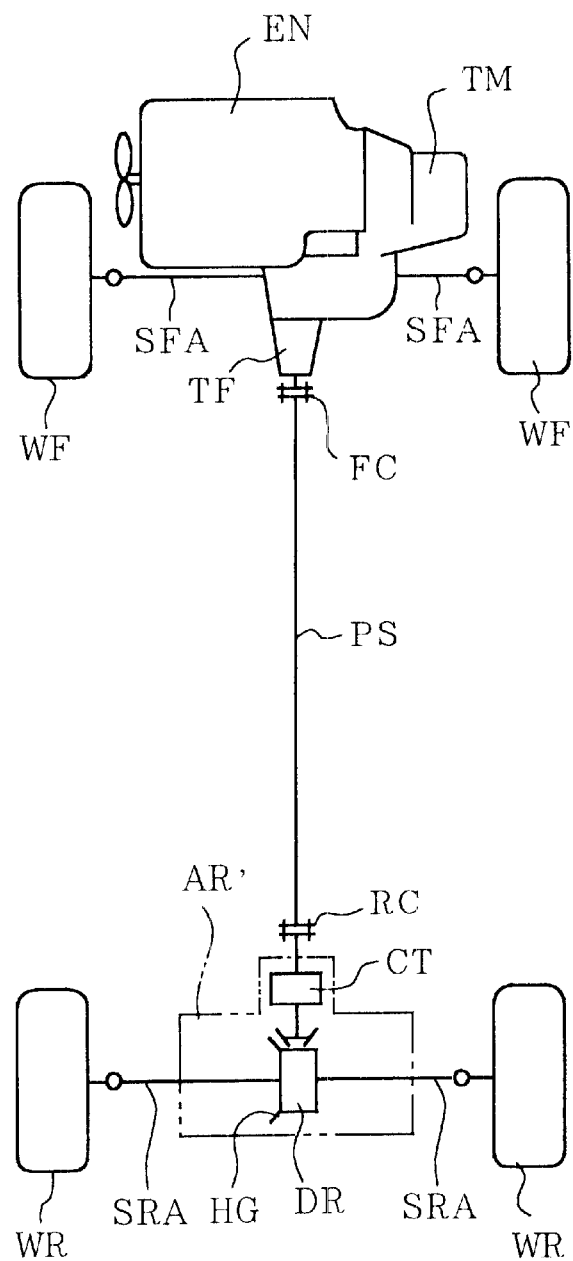
FIG. 8 is a schematic diagram illustrating a power transmission system pertaining to a different example of a four-wheel-drive vehicle, equipped with the electromagnetic clutch pertaining to the present invention.

In the above-mentioned rear axle device AR, left and right rear differential clutch mechanisms DRL and DRR are disposed on either side of a driven gear 15 that constitutes a hypoid gear mechanism HG, but the electromagnetic clutch mechanism pertaining to the present invention may instead be disposed ahead of the hypoid gear mechanism HG, as shown in FIG. 8. Those components in FIG. 8 that are the same as in the power transmission system in FIG. 1 are labeled the same, and will not be described again.

With the power transmission system in FIG. 8, the electromagnetic clutch mechanism is disposed between the rear coupling RC and the hypoid gear mechanism HG, and a 2–4 switching mechanism CT is constituted by this electromagnetic clutch mechanism. As a result, power transmission from the propeller shaft PS to the hypoid gear mechanism HG can be blocked to achieve a two-wheel-drive state, or this power transmission can be enabled to achieve a four-wheel-drive state. The power is split by a rear differential mechanism DR and transmitted from the hypoid gear mechanism HG to the left and right rear wheels WR. This rear differential mechanism DR may be a mechanism commonly used in the past, or the left and right rear differential clutch mechanisms DRL and DRR discussed above may be used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A linking structure for a power transmission device, comprising:
   a propeller shaft that transmits rotational drive force and a rotation transmission device that is linked to the propeller shaft and transmits rotational drive force, said linking structure linking said propeller shaft and said rotation transmission device;
   wherein a first mark is provided to the propeller shaft for indicating a rotational imbalance direction in the propeller shaft;
   a second mark is provided to a companion flange, that is linked to the propeller shaft in the rotation transmission device, for indicating a rotational imbalance direction in the companion flange; and
   the propeller shaft and the companion flange are linked on a basis of the first and second marks; and
   the first mark is provided in a direction in which an unbalanced rotational mass of the propeller shaft becomes lighter; and the second mark is provided in a direction in which an unbalanced rotational mass of the companion flange becomes heavier; and the propeller shaft and the companion flange are linked such that the first and second marks are as close together as possible.

2. A linking structure for a power transmission device, comprising:

a propeller shaft that transmits rotational drive force and a rotation transmission device that is linked to the propeller shaft and transmits rotational drive force, said linking structure linking said propeller shaft and said rotation transmission device;

wherein a first mark is provided to the propeller shaft for indicating a rotational imbalance direction in the propeller shaft;

a second mark is provided to a companion flange, that is linked to the propeller shaft in the rotation transmission device, for indicating a rotational imbalance direction in the companion flange; and the propeller shaft and the companion flange are linked on a basis of the first and second marks; and the first mark is provided in a direction in which an unbalanced rotational mass of the propeller shaft becomes heavier; and the second mark is provided in a direction in which an unbalanced rotational mass of the companion flange becomes lighter; and the propeller shaft and the companion flange are linked such that the first and second marks are as close together as possible.

3. The linking structure according to either claim 1 or 2, wherein the companion flange is directly and rotatably supported by a bearing in the rotation transmission device.

4. The linking structure according to either claim 1 or 2, wherein the rotation transmission device comprises an axle device having a final reduction device, and the companion flange is attached to an input rotation shaft of the final reduction device.

5. The linking structure according to claim 4, wherein the final reduction device comprises a hypoid drive pinion and a hypoid driven gear that mesh with each other, a pinion shaft having this hypoid drive pinion constitutes the input rotation shaft, and the companion flange is splined to the pinion shaft.

* * * * *